US012293514B2

United States Patent
Vinçon et al.

(10) Patent No.: US 12,293,514 B2
(45) Date of Patent: May 6, 2025

(54) METHOD OF, AND COMPUTERIZED SYSTEM FOR LABELING AN IMAGE OF CELLS OF A PATIENT

(71) Applicant: UMMON HEALTHTECH, Mâcon (FR)

(72) Inventors: Nathan Vinçon, Bures sur Yvette (FR); Louis-Oscar Olivier Félix Morel, Mâcon (FR)

(73) Assignee: UMMON HEALTHTECH, Mâcon (FR)

( * ) Notice: Subject to any disclaimer, the term of this patent is extended or adjusted under 35 U.S.C. 154(b) by 266 days.

(21) Appl. No.: 17/774,433

(22) PCT Filed: Nov. 4, 2020

(86) PCT No.: PCT/EP2020/080895
§ 371 (c)(1),
(2) Date: May 4, 2022

(87) PCT Pub. No.: WO2021/089589
PCT Pub. Date: May 14, 2021

(65) Prior Publication Data
US 2022/0392203 A1    Dec. 8, 2022

(30) Foreign Application Priority Data
Nov. 4, 2019   (EP) ..................................... 19206849

(51) Int. Cl.
*G06V 10/82* (2022.01)
*G06T 7/00* (2017.01)
(Continued)

(52) U.S. Cl.
CPC .......... *G06T 7/0012* (2013.01); *G06V 10/255* (2022.01); *G06V 10/764* (2022.01);
(Continued)

(58) Field of Classification Search
None
See application file for complete search history.

(56) References Cited

U.S. PATENT DOCUMENTS 6,165,734 A * 12/2000 Garini ...................... G01J 3/26
435/14
2011/0183333 A1    7/2011 Martin et al.
(Continued)

FOREIGN PATENT DOCUMENTS

CN       112215790 A *  1/2021
EP       1422526 A1     5/2004
(Continued)

OTHER PUBLICATIONS

Office Action and Examiner Search Report dated Oct. 25, 2024 for Canadian Application No. 3,159,080.
(Continued)

*Primary Examiner* — Mohammed Rachedine (57) ABSTRACT

The method of labeling an image of cells of a patient, in particular an immunocytochemistry image comprises the following steps. First, a digital image of a stained immunocytochemistry biological sample of the patient is received. Following by the step that a computerized classification of cells in the digital image based on color, shape or texture in the digital image, the digital image is labeled by application of a trained neural network on at least one portion of the digital image which comprises a digital image of one cell classified under a first category during the computerized classification.

11 Claims, 3 Drawing Sheets

(51) Int. Cl.
  *G06V 10/20* (2022.01)
  *G06V 10/764* (2022.01)
  *G06V 10/774* (2022.01)
  *G06V 20/69* (2022.01)

(52) U.S. Cl.
  CPC .......... *G06V 10/7747* (2022.01); *G06V 10/82* (2022.01); *G06V 20/698* (2022.01); *G06T 2207/10056* (2013.01); *G06T 2207/30024* (2013.01)

(56) References Cited

U.S. PATENT DOCUMENTS

| | | | |
|---|---|---|---|
| 2013/0237546 A1* | 9/2013 | Tan | A61P 35/00 514/346 |
| 2015/0099651 A1 | 4/2015 | Martin et al. | |
| 2018/0232883 A1* | 8/2018 | Sethi | G16H 30/40 |
| 2019/0042826 A1* | 2/2019 | Chang | G06T 7/11 |
| 2019/0206056 A1 | 7/2019 | Georgescu et al. | |
| 2020/0001063 A1* | 1/2020 | Rand | A61M 37/0015 |
| 2022/0392203 A1 | 12/2022 | Vincon et al. | |

FOREIGN PATENT DOCUMENTS

| | | | | |
|---|---|---|---|---|
| EP | 3816934 A1 | 5/2021 | | |
| WO | WO0050451 A2 | 8/2000 | | |
| WO | WO0217947 A2 | 3/2002 | | |
| WO | WO-2008151110 A2 * | 12/2008 | ............. | C12Q 1/686 |
| WO | WO-2012041333 A1 * | 4/2012 | ............ | G06K 9/0014 |
| WO | WO2016094330 A2 | 6/2016 | | |
| WO | WO2018207261 A1 | 11/2018 | | |
| WO | WO2021089589 A1 | 5/2021 | | |

OTHER PUBLICATIONS

Fahime Sheikhzadeh et al., "Automatic labeling of molecular biomarkers of immunohistochemistry images using fully convolutional networks," Jan. 19, 2018, pp. 1-18, PLoS One 13(1): e0190783.

Yi Qin et al., "Computerized Delineation of Nuclei in Liquid-Based Pap Smears Stained with Immunohistochemical Biomarkers," 2015, pp. 110-119, Cytometry Part B (Clinical Cytometry) 888:110-119 (2015).

Fahime Sheikhzadeh et al., "Automatic labeling of molecular biomarkers on a cell-by-cell basis in immunohistochemistry images using convolutional neural networks," 2016, Anant Madabhushi, Proc. of SPIE vol. 9791, 97910R.

"CINtec® PLUS Cytology Kit Jetzt vollautomatisiert auf VENTANA BenchMark XT und ULTRA," 2014, Roche Diagnostics.

Dietmar Schmidt et al., "p16/Ki-67 Dual-Stain Cytology in the Triage of ASCUS and LSIL Papanicolaou Cytology," Mar. 25, 2011, pp. 158-166, Cancer Cytopathology.

Communication pursuant to Article 94(3) EPC dated Jun. 7, 2023 from European Patent Office regarding application No. 19206849.2.

Notice of Reasons for Rejection mailed Jun. 5, 2023 from Japanese Patent Office regarding application No. 2022-525624.

Notice of Reasons for Rejection mailed Dec. 4, 2023 from Japanese Patent Office regarding application No. 2022-525624.

Notice from Canadian Intellectual Property Office dated Jun. 7, 2023 for Application No. 3,159,080.

Requisition by the examiner dated Jan. 17, 2024 for Application No. 3,159,080.

Communication Pursuant to Article 94(3) EPC dated Apr. 4, 2024 for Application No. 19206849.2.

* cited by examiner

METHOD OF, AND COMPUTERIZED SYSTEM FOR LABELING AN IMAGE OF CELLS OF A PATIENT

CROSS-REFERENCE TO RELATED APPLICATION

This application is a national stage application, filed under 35 U.S.C. § 371, of International Patent Application No. PCT/EP2020/080895, filed on Nov. 4, 2020, and claims priority to European application No. 19206849.2 filed Nov. 4, 2019, which is incorporated by reference herein in its entirety.

FIELD OF THE INVENTION

The present invention relates to methods of labeling an image of cells of a patient, computerized systems for labeling an image of cells of a patient, in particular an immunocytochemistry image, related computer programs, and biological samples used in this context.

TECHNOLOGICAL BACKGROUND

More precisely, the invention relates to a method of labeling an image of a biological sample of a patient comprising cells.

It is known to use tissue samples of a patient, typically a human patient, to diagnose cancer. Such methods comprise obtaining a tissue sample of the patient, marking said tissue, and analyzing the marked tissue in search for the presence of markers which are typically present in case of cancer. There are many possible ways of performing each of the above steps.

One typical example of the above methods is the so-called p16/ki67 test.

Typically, this test is performed on a patient tissue sample obtained through a biopsy performed on the patient. The obtained tissue sample is stained using the specific CINtec PLUS kit provided by Roche, and the stained samples can be observed, for example using a microscope, by the pathologist. The pathologist will browse through the stained samples, and try to identify cells which are positive to both tests, i.e. p16-positive and ki67-positive (or "double positive") cells.

Recently, it was proposed to digitalize the stained biological samples, so that the search for double positive cells can be performed on digital images of the stained biological samples, using a computer. However, it remains difficult for a pathologist to identify double positive cells even on a computer screen. This is especially the case since a tissue sample may comprise many cells, and the pathologist has to identify, among them, a single double positive cell.

Recently, in "Automatic labeling of molecular biomarkers of immunochemistry images using fully convolutional networks", Sheikhzadeh et al., PLoS ONE 13 (1): e0190783 (https://doi.org/10.371/journal.pone_0190783), published Jan. 19, 2018, it was proposed to apply neural networks on immunochemistry images of biological tissue samples (or "immunohistochemistry images") in order to identify cells likely to be double positive cells. This application appears to be based on the prior publication "Automatic labeling of molecular biomarkers on a cell-by-cell basis in immunohistochemistry images using convolutional neural networks", Sheikhzadeh et al., Progress in Biomedical Optics and Imaging, SPIE—International Society for Optical Engineering, Bellingham, WA, US, vol. 9791, 23 Mar. 2016.

However, the process which is described there is very computationally intensive. Further, the neural network, and hence the whole process, operates as a black box, which makes it difficult for the pathologist to interpret the results, and in particular to trust the result, in order to perform a reliable diagnostic.

One other issue of this publication, is that the biological tissue which is used was obtained through a biopsy, which is an invasive test.

The invention aims at alleviating some of these issues.

SUMMARY OF THE INVENTION

Thus, the invention relates to a method of labeling an image of cells of a patient, in particular an immunocytochemistry image, comprising:
  Receiving a digital image of a stained immunocytochemistry biological sample of the patient,
  Performing a computerized classification of cells in the digital image based on at least one of color, shape and texture in the digital image,
  Labeling the digital image by applying a trained neural network on at least one portion of the digital image which comprises a digital image of one cell classified under a first category during the computerized classification.

Thus, the neural network is applied only on a selection of candidate portions of the image. This makes it possible to obtain a quick and efficient labeling method.

According to various aspects, one or more of the following features may be implemented.

According to some embodiments, the computerized classification of cells involves determining a barycenter of a cell or of a nucleus of said cell in the digital image.

According to some embodiments, the computerized classification of cells involves:
  applying a plurality of test functions on a portion of the digital image to provide a test result representative of positivity to a respective test for this portion, and
  applying a scoring function combining the test results of the test functions for this portion of the digital image.

According to some embodiments, at least one test function is interpretable and/or explainable, and at least one test function is a non-interpretable function.

According to some embodiments, the test functions are applied on a portion of the image around said barycenter.

According to some embodiments, performing a computerized classification of cells further comprises displaying candidate cells ordered according to the computerized classification.

According to some embodiments, performing a computerized classification of cells comprises classifying pixels according to their color.

According to some embodiments, performing a computerized classification of cells comprises classifying regions of the digital image according to the number of neighboring pixels of a pre-defined color range.

According to some embodiments, performing a computerized classification of cells comprises using at least one function which has been obtained through machine-learning applied on prior labelled data.

According to some embodiments, performing a classification of cells comprises:
  Performing a first computerized classification of cells of the digital image based on at least one of color, shape and texture in the image, On cells classified under a first category during the first computerized classification, performing a second computerized classification of said cells based on at least one of color, shape and texture in the digital image, different from the first computerized classification, And labeling comprises applying the trained neural network on cells classified under a first category during the second computerized classification.

According to some embodiments, performing a computerized classification of cells includes labelling cells with respect to a growth inhibitor marker and/or a proliferation marker.

According to some embodiments, performing a computerized classification of cells includes labelling cells with respect to one or both of the KI67 marker or the p16-marker.

According to some embodiments, the method further comprises:

Non-surgically obtaining a biological loose-cells sample of the patient, acquiring a digital image of a stained immunocytochemistry biological sample of the patient.

According to another aspect, the invention relates to a computer program comprising instructions which, when the program is executed by a computer, cause the computer to carry out the above methods.

According to another aspect, the invention relates to a computerized system for labeling an image of cells of a patient, in particular an immunocytochemistry image of a patient, comprising:

A reception module for receiving a digital image of a stained immunocytochemistry biological sample of the patient, A classification module for performing a computerized classification of cells in the digital image based on at least one of color, shape and texture in the digital image, A labeling module for labeling the digital image by applying a trained neural network on at least one portion of the digital image which comprises a digital image of one cell classified under a first category by the classification module.

According to another aspect, the invention relates to a stained immunocytochemistry biological loose-cells sample for use in the diagnostic of cancer through a machine-learned labelling process.

BRIEF DESCRIPTION OF THE DRAWINGS

Embodiments of the invention will be described below, in relation to the following drawings.

DEFINITIONS

"p16" or "cyclin-dependent kinase inhibitor p16INK4a" as used herein refers to cyclin-dependent kinase inhibitor p16INK4a (also denominated as CDKN2 or MTS1) the gene of which is located in chromosomal region 9p21. P16INK4a was first described in Serrano, M., et al., Nature, 1993 Dec. 16; 366(6456):704-7. The terms "p16INK4a" or "cyclin-dependent kinase inhibitor p16INK4a" as used in the context of the present invention refers to nucleic acid as well as polypeptide molecules. "p16" or "cyclin-dependent kinase inhibitor p16INK4a" thus comprises e.g. RNA (mRNA, hnRNA, etc.), DNA (cDNA, genomic DNA etc.), proteins, polypeptides, proteoglycans, glycoproteins and the respective fragments of these molecules. The p16 protein is known to be a non-proliferation factor.

The term "(cell) proliferation marker" or "marker for cell proliferation" as used in the context of the present invention shall comprise any marker molecule known in the art to be characteristic for the proliferation status of cells. The proliferation status may e.g. be a status of actively proliferating cells, of retarded cell proliferation, of arrested cell proliferation, of senescent cells, of terminally differentiated cells, of apoptosis etc. In one embodiment of the invention the cell proliferation marker is a marker molecule characteristic for active cell proliferation. In another embodiment of the invention, the proliferation marker molecule may be a molecule characteristic for arrested, terminally differentiated, senescent or apoptotic cells. Generally throughout the text, the term "(cell) proliferation marker" or "marker for cell proliferation" in the various grammatical forms is used to denominate proteins as well as nucleic acid markers. In case the protein name of a marker such as e.g. "replication protein" is used herein, this use shall be understood to be metonymically and pertain as well to the protein as to the nucleic acid marker molecules encoding the particular protein.

In certain embodiments proliferation markers for use in the context of the present invention may comprise genes engaged in the DNA replication such as e.g. proteins of the pre-initiation complex or of the replication fork. Such molecules may e.g. comprise helicases, such as eukaryotic helicase or MCM proteins (MCM2, MCM3, MCM4, MCMS, MCM6, MCM7), protein IP as disclosed in WO00/50451 and WO 02/17,947 (also denominated HELAD1, Pomfil2, Unc53), kinases or phosphatases engaged in the replication process such as e.g. CDC6, CDC7, CDC7 protein kinase, Dbf4, CDC14, CDC14 protein phosphatase, CDC45 and MCM10. Furthermore proliferation markers may comprise proteins engaged in the processive replication fork such as e.g. topoisomerases (e.g. topoisomerase2alpha) PCNA or DNA polymerase delta, replication protein A (RP A), replication factor C (RFC), FEN 1.

In other embodiments the proliferation markers may comprise molecules necessary for the maintenance of cell proliferation such as Ki67, Ki-S5 or Ki-S2. In this embodiment, proteins may be e.g. present throughout the whole cell cycle. They are useful in the framework of the present invention provided they are characteristic for active cell proliferation and are not significantly expressed in arrested, terminally differentiated, apoptotic or senescent states of cells. Ki67, Ki-S2 and Ki-S5 as used herein shall denominate the protein marker molecules detected by the respective antibodies as well as the nucleic acids encoding these antigens.

The expression "biological sample" comprises any tissue or cell samples of any kind and nature. Examples of such tissue or cell samples are secretions, swabs, lavages, body fluids, semen, cell- and tissue-samples, blood, smears, sputum, urine, stool, liquor cerebrospinalis, bile, gastrointestinal secretions, lymph, bone marrow, aspirates and biopsies of organs such as needle or punch biopsies and (fine)-needle aspirates. The samples may in certain embodiments comprise cervical smears, nipple aspirate fluid, bronchioalveolar lavages etc. In particular, smears, swabs and biopsies are indicated when the detection of anogenital cancers, e.g. cervical cancers, is concerned. According to the present invention cell or tissue samples may as the case may be comprise cells of the anogenital tract, of the respiratory tract or of the skin and its appendages. In certain embodiments the cells may be cells of the uterine cervix, the vagina, the vulva, the penis, the anus, the rectum, the breast, the bronchic tree, the lung, the peritoneum, the peritoneal space, the naso-pharyngeal space, the oral cavity or the skin.

DETAILED DESCRIPTION

Below, one example of the invention will be described in relation to the p16/ki67 test.

According to this example, a test is performed with the aim of assisting the pathologist in diagnosing cervix cancer.

According to a first step of the embodiment, patient biological sample must be obtained. According to one aspect, the patient biological sample is obtained non-invasively. In particular, the patient biological sample is obtained without using a biopsy. According to one example, patient biological sample comprises gynecological sample obtained through cervical-uterine smear. The patient biological sample is collected using a cervical sampling device, and is then handled according to typical biological sample handling procedures, in order to provide the patient biological sample on a slide. Sample handling may include dispersion, dilution and/or filtering. The biological sample may thus comprise loose cells.

The patient sample is then stained according to the procedure appropriate for the specific test. According to one example, Papanicolaou coloration can be applied to a portion of the sample, and another portion of the sample is preserved for a potential CINtec PLUS test.

One form of the Papanicolaou stain involves five stains in three solutions.

The first staining solution may contain haematoxylin, for example Harris's hematoxylin, which stains cell nuclei.

The second staining solution may contain Orange G in 95% ethyl alcohol with a small amount (for example about 5% to 10%) of phosphotungstic acid.

The third staining solution, also called "EA solution" may be composed of three dyes, Eosin Y, Light Green SF yellowish, and Bismarck brown Y in 95% ethyl alcohol with a small amount of phosphotungstic acid and lithium carbonate.

One may also use counterstains. The counterstains may be dissolved in 95% ethyl alcohol, so as to prevent cells from over staining, which would obscure nuclear detail and cell outlines, especially in the case when cells are overlapping on the slide. Phosphotungstic acid may be added to adjust the PH of counterstains and helps to optimize the color intensity.

Eosin Y stains the superficial epithelial squamous cells, nucleoli, cilia, and red blood cells. Light Green SF yellowish stains the cytoplasm of other cells, other than superficial squamous cells. Superficial cells are orange to pink, and intermediate and parabasal cells are turquoise green to blue.

Observation of the result of the coloration tests will enable the pathologist to determine the cell type of the cells in the biological sample.

In some cases, the pathologist will then conduct the p16/KI67 test on the second portion of the biological sample.

This involves using the CINtec PLUS test kit provided by Roche on this biological sample. This test kit includes binding agents designed to react with the targeted proteins.

Binding agents as used in the context of the present embodiment for the detection of the level of cyclin-dependent kinase inhibitor polypeptides such as p16INK4a or p14ARF polypeptides and proliferation marker polypeptides such as e.g. MCM5, MCM2, Ki67, Ki-S5, PCNA or Ki-S2 polypeptides may comprise antibodies. An antibody or antigen-binding agent is said to react specifically, if it reacts at a detectable level with a protein disclosed herein, and does not significantly react with other proteins. The term "antibody" in all its grammatical forms as used in the context of the present invention shall comprise any kind of antibody including monoclonal and polyclonal antibodies, antigen-binding fragments, antibody fragments, fab' fragments, bi-functional hybrid antibodies, single chain antibodies, humanized antibodies peptidomimetics containing minimal antigen-binding epitopes, anti-cullines (Anti-caline™) etc.

The kit is designed to perform a 2-step immunocytochemical staining procedure on the cervical cytology preparation and may contain primary antibodies directed to the protein of interest, and reagents directed to this compound and marked with a marker. For example, the primary antibodies comprise a ready to use primary antibody cocktail comprising both a monoclonal antibody directed to the human p16INK4a protein and a monoclonal antibody directed against human Ki67 protein. For example, the first antibody comprises a mouse monoclonal antibody (clone E6H4) directed to human p16INK4a protein and the second antibody comprises a rabbit monoclonal antibody (clone 274-11 AC3) directed to the human Ki67 protein.

According to one example, ready-to-use reagents comprise 1) a polymer reagent conjugated to horseradish peroxidase (HRP) and goat antimouse fragment antigen-binding Fab' antibody fragments and 2) a polymer reagent conjugated to alkaline phosphatase (AP) and goat antirabbit Fab' antibody fragments. The antibody fragments will bind, respectively, to the KI67 compound and to the p16 compound. HRP-mediated conversion of 3,3'-diaminobenzidine (DAB) chromogen, and AP-mediated conversion of Fast Red chromogen lead to brown and red staining at the p16 and Ki67 antigen sites, respectively. After counterstaining by alcohol-free hematoxylin, a 2-step mounting procedure is applied, first by using an aqueous mounting medium provided with the kit to prevent alcohol-based fading of the Fast Red signal, then followed by a permanent mounting step.

The thus obtained slide is ready for processing. Processing involves scanning the slide with a digital camera.

The invention relies on prior labeled data. Prior labeled data may be labeled without using the present method, for example relying on know-how of a pathologist analyzing images, and labeling images of cells or nucleus as positive and negative. In particular, in the context of the present embodiment, pathologists may classify cells as p16-positive or -negative and KI67-positive or -negative. This would result in four cell classifications, namely "double negative", "KI67-positive only", "p16-positive only" and "double positive". In certain cases, the double-positivity of a cell may need to be confirmed by another trained pathologist, before the cell is classified as double-positive. The whole biological sample may also be classified. For example, a biological sample comprising at least k double-positive cells can be classified as positive. The number k may for example be equal to one. After sufficient samples have been processed according to the present invention, the result of their process may be input also as prior labeled data.

Figure 1:
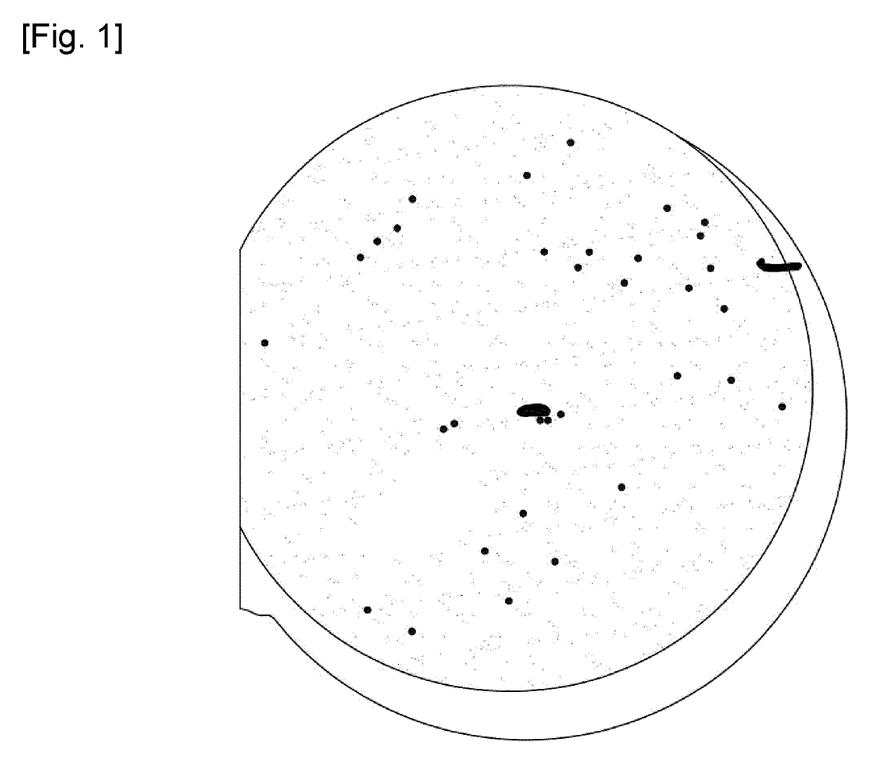
FIG. 1 shows a digital image of a biological sample usable within the frame of one embodiment of the invention.

FIG. 1 shows an example of a digital image of a slide comprising stained human patient biological sample non-invasively obtained from a smear.

Each pixel is characterized by coordinates in a (x; y) plane and intensities of each of three RGB channels.

According to a first step, the method includes a search for regions of the digital image which are likely to be positively labeled. The search step is repeatedly performed on a plurality of spaced apart windows, each of the windows comprising a portion of the digital image. For example, the windows have the same size. According to one embodiment, the windows overlap one another. For example, the portion of a current window overlapping a previous window is comprised between 10% and 75% of the size of the window. The typical size of a window is chosen to encompass one typical cell or one typical cell nucleus. The typical absolute size of a window is therefore between 50 and 150 micrometers. According to a typical resolution of current digital cameras, that would mean a window size typically between 100 and 1000 pixels. The window is for example square, or rectangular, where the above size is the size of the smaller side. Other shapes are possible.

On a given window, a pixel classification function is applied. The pixel classification function uses as entry parameters the intensities for the various channels of the RGB pixel. In the present example, the pixel classification function is a function of classification of the pixel with respect to the KI67 marker. The resulting pixel is classified as either positive or negative. The pixel classification function was obtained by applying a machine-learning process on prior labeled data, as discussed above. For example, the machine-learning process comprises an evolutionist algorithm. Based on prior labeled data, the pixel classification function is determined, which classifies pixels on prior labeled data as either pixels of a positive cell or pixels of a negative cell with a good probability. Because p16-marked cells will be tainted in brown, this may impact the ability to identify KI67-positive cells which also are p16-positive, because the pixels are likely to have a different colour as an overlay of brown on red. Note that, at this step, the accuracy does not need to be extremely high, because other steps of the process will enable to accurately determine positive cells. The present step is notably here to quickly get rid of manifestly non-relevant data, which is the majority of data in the image. Notably, regarding the KI67 marker, which is expressed in the nucleus, the pixel classification function was obtained by applying the machine-learning process on prior labeled data of nucleus of cells known to be either positive or negative.

From time to time, when new prior labeled data is obtained, the pixel classification function might be updated based on this new prior labeled data. New prior labeled data might be obtained as the outcome of applying the present process on patient data.

Thus, as the outcome of the pixel classification function, each pixel is characterized by its coordinates, its intensities for each of the RGB Channels, and its positivity to the pixel classification function.

Then, the window is assessed for further processing. According to one example, this involves checking the total number of positive pixels in the window, compared to a predetermined threshold of number of pixels. If the window comprises a number of positive pixels less than the predetermined threshold, it is discarded. Typically, this would indicate that the window does not comprise at least one positive nucleus.

According to a variant example, the pixel classification function is used on each pixel, and then the windows are defined and investigated for further processing.

According to a second step, the method includes a labelling of regions. In this step, regions are labelled according to the size of groups of neighboring pixels classified as positive during the preceding step. For example, the step is performed for each window not discarded during the preceding step. The region labeling step comprises a determination of a surface area of neighboring positive pixels, which can be performed by any suitable method. For example, one method involves identifying a not-evaluated positive pixel in the window, and determining all positive pixels which are in contact with the one pixel, either directly, or indirectly through an intermediate positive pixel. Contact might be either lateral only or both lateral and diagonal. This set of pixels is assigned to a labelled region. This step is repeated as long as the window comprises not-evaluated positive pixels.

Accordingly, a pixel may be characterized by its coordinates, its intensities for each of the RGB Channels, its positivity to the pixel classification function, and its status with respect to evaluation by the region-labelling function.

The labelled regions are classified according to their size. For example, the regions are classified by comparing their size, as determined above, with a predetermined size threshold. In particular, the regions with the higher sizes are classified as positive. Alternatively, alternate or additional parameters are taken into account for this determination, such as shape of the region.

If the positive pixels are located on a border of the current window, a new window is defined, which is centered on these pixels. The region labeling step is then performed on this new window for all positive pixels of this new window which neighbor the initial positive pixel of the region, which results, in case of a positive region, in a positively labelled region.

The following steps of the process will be applied to the positively classified regions. The barycenter of the region is determined based on the coordinates of the positive pixels which are part of the region. Hence, as a result of the region-labelling function, a positive region is characterized by two parameters, namely an identification and its barycenter coordinates.

According to a next step, a scoring operation is performed for each positively-classified region. The scoring operation is performed by combining the results of a plurality of test functions applied to a portion of the positively-classified region. This portion might be defined by applying a mask to the positively-classified region. According to one example, for the definition of the mask, a window is defined, which is centered on the barycenter of the positively-classified region. The window has, for example, the same size as the windows discussed above. Therefore, the window will cover both the nucleus, and part of cell material surrounding the nucleus. The mask might be defined based on a pixel-classification function. The pixel classification function may be applied to the pixels of the digital image in the window. The pixel classification function uses as entry parameters the intensities for the various channels of the RGB pixel. In the present example, the pixel classification function is a function of classification of the pixel with respect to the KI67 marker or with respect to the p16 marker, where "or" represents a logical "or". The resulting pixel is classified as either positive or negative. This pixel classification function was obtained by applying a machine-learning process on prior labeled data, as discussed above. For example, the machine-learning process comprises an evolutionist algorithm. Based on prior labeled data, the function is determined, which classifies pixels on prior labeled data as either pixels of a positive cell or pixels of a negative cell with a high likeliness. The output of the mask is a portion of the positively-classified region, where pixels are of either color of the current pixel classification functions. Alternatively, the test function might be applied directly to the positively-classified region.

The scoring step applies a plurality of test functions to the pixels of the digital image in this portion of the positively-classified region. A test function may comprise a color test function, which will provide a score for a given window for the given color. For example, if a color test function is related to a specific color hue, the test result will be a given score, comprised for example between 0 and 100, related to the presence or absence of this color hue in the window. In particular, the test result might be related to the size of the portion of the image within the defined positive color range, i.e. a number of pixels or size.

A test function may comprise a texture test function. For example, texture might be defined as Haralick texture. This texture definition uses a covariance matrix between each pixel and its neighbours. The matrix might be used as input of a machine-learned scoring process. The machine-learned scoring process might be based on prior images for which this matrix can be calculated, and a label related to the texture of that image. Other definitions of texture might be used. Hence, a high score will be obtained if the digital image is textured, i.e. if many zones verify the above condition.

A test function may comprise a homogeneity test function. For example, this test function will provide a test result which will be higher in case of uniformity of color of the pixels in the positively-classified region. This test function relies on a distance between colors. Any suitable distance might be used.

A test function may comprise a shape test function. For example, this test function will provide a test result which will be higher if the shape of the pixels in the positively classified region approximates one of one or more of pre-defined shapes. This test function relies on a distance between shapes. The shape of the positively-classified region might be determined based on a distribution of the position of the pixels around the center of gravity. Any suitable distance might be used, such as, for example, using a Kullback-Leibler divergence algorithm.

A test function may comprise a contact size test function. For example, this test function will provide a test result which will be higher if the size of the contact region between the KI67-positive pixels and the p16-positive pixels is higher. This test function will provide a test result which is higher if the size of the relevant area is higher. It relies, for example, on determining the number of KI67-positive pixels which have at least one neighbor which is a p16-positive pixel.

Hence, for each portion of the positively-classified region, a score is obtained.

From 1 to 20 or more test functions may be applied, for various colors and/or textures.

The score is defined as a combination of the above test results.

The scoring operation applies a scoring function to the results of each of the above test functions. The scoring function might be defined by a machine-learning process. The machine-learning process is based on prior labeled data. Notably, the scoring function will be developed so as to, when applied to prior labeled images of cells, provide a higher score for images of cells which were classified as positive in the prior labeled data. This means the test functions would be applied to the prior labeled data, and the scoring function would be trained on the results of the test functions applied to the prior labeled images of cells and their known classification as positive or negative. The machine learning process applies for example an evolution algorithm to determine a suitable scoring function. The scoring function may use only simple mathematical operators, such as additions, multiplications, exponential or logarithm, for example. It comprises weights which are real number defined by the machine-learning algorithm, and scores can be provided also in the form of real numbers.

From time to time, when new prior labeled data is obtained, the scoring function might be updated based on this new prior labeled data. New prior labeled data might be obtained as the outcome of applying the present process on patient data.

Hence scoring is based on test functions, which apply simple processing on the digital images, and a pre-defined combination of results of test functions, which involves few mathematical operations.

The regions can be sorted following their score, and displayed on screen in this order, the regions with the highest score being displayed first.

Figure 2:
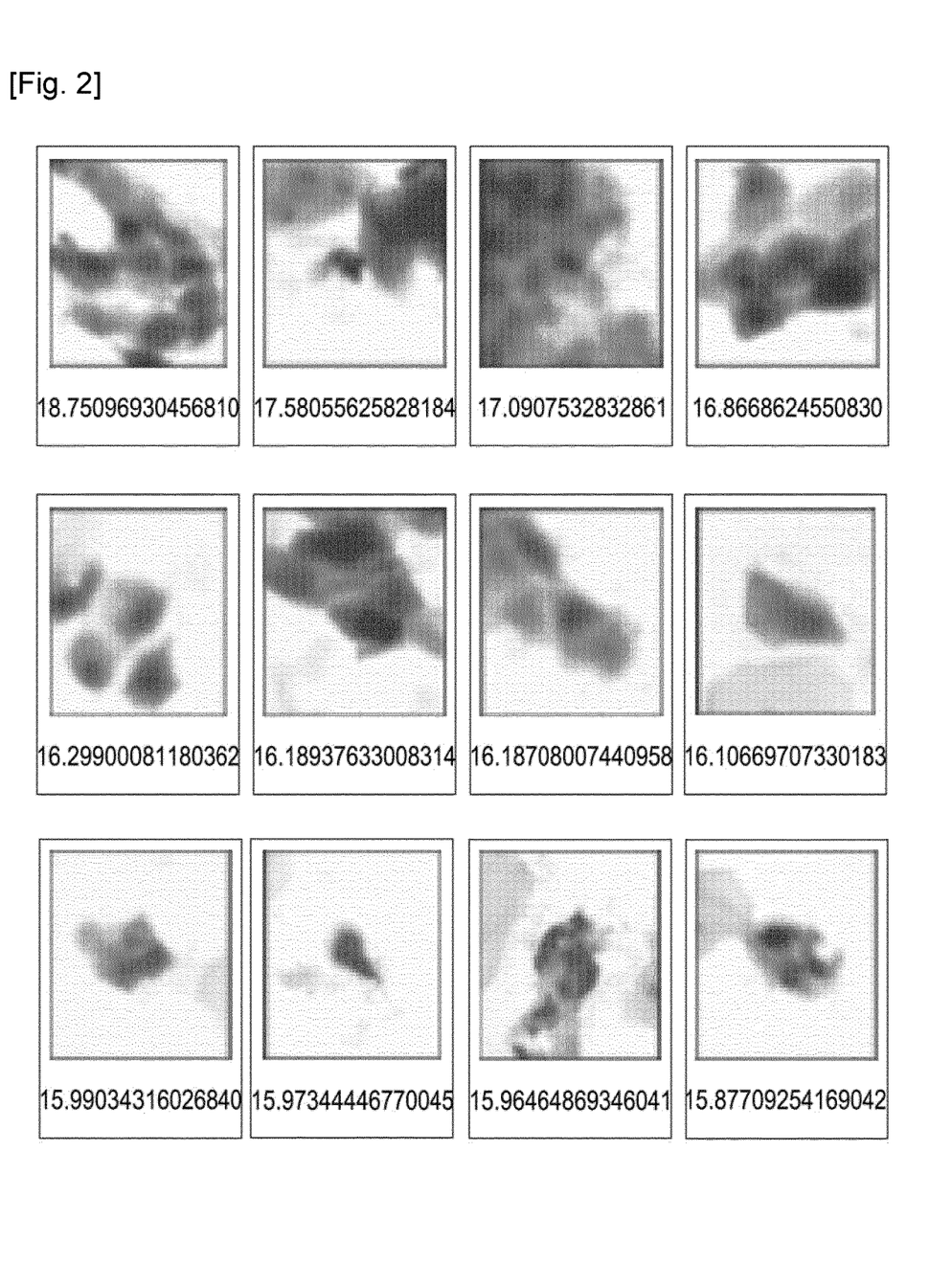
FIG. 2 shows an extract of a display of the result of the scoring step according to one embodiment of the invention.

FIG. 2 shows a display of the outcome of the above described process. The pathologist is thus able to review the regions of the digital image which are most likely to be positive.

A neural network is applied to the results of the tests. The input of the neural network is the part of the digital image which has been defined by the process above, and is centered on the determined barycenter of the region (likely corresponding to the barycenter of the nucleus), and has a shape around this barycenter, such as, for example, a square window with a size of 300 to 1000 side pixels, or a rectangular, polygonal or circular window. The output of the neural network will be a likeliness of positivity to the biomarker for this region. The neural network was trained on data which include images of cells which were classified as either positive or negative to the biomarker.

The result of the neural network can be displayed on the display screen near the portion of the digital image it relates to, to assist the pathologist in performing the diagnostic. For example, on the display screen, regions of the digital image are ordered following the likeliness as defined by the neural network.

During a verification step, the above process can be performed again on altered versions of the digital image. An altered version will not change the optical characteristics of the image, but will change the shape of cells or nucleus, by applying a mathematical transform function on the original digital image. In case the result of the process applied on the altered version of the image will not give the same classification as the original process, this information would be provided to the pathologist.

The pathologist may record the biological sample as being either positive or negative. In case the biological sample is positive, further process may be applied to the patient. This may include a biopsy or colposcopy, for example.

Depending on the test, positivity may be assessed by the pathologist according to known rules. According to one example, the pathologist may consider the test positive as soon as one single window is positive. If there is a single window positive to the pathologist, it is likely to lie among the 100 first results of the above process.

According to some other tests, positivity may be determined by the pathologist if a given quantity of windows are positive, for example 5 or 10 positive windows.

Even though the example below was described with respect to a double positive marker, the invention might be implemented, in other embodiments, with a single marker. A double marker might be more difficult to handle, because of the overlay, in the image, by both markers.

The above example is provided with respect to a immunochemistry image of a patient. According to another embodiment, an alternative process may be applied to a immunohistochemistry image. Notably, under this other embodiment, the search for positive regions might be altered or unused.

Above, an embodiment of the invention was described by reference to a process which is, for most parts, computerized. So, when a process step is described above, it should be understood that the process step is performed by a computer, unless it is clear from the context that the step is not computerized (notably, part of the biological sample acquisition and preparation steps).

The invention may therefore be embodied in a computerized system comprising computerized modules which execute the above steps. Such a computerized system will comprise a processor or other class of computer which will execute a computer program to perform the above steps. The computer program might, at some point, be carried by a suitable support. The computerized system may also comprise a memory storing information, such as digital images, and/or a database of prior test results. The computerized system may also comprise a human/machine interface for enabling human interaction with the program, such as a screen having a display, and/or various information input devices. The various components of the computerized systems, or parts of these components, might be distributed over a network.

In particular, the computerized system may comprise a reception module receiving a digital image of a stained immunocytochemistry biological sample of the patient. This will typically be received from a scanner, potentially through a network, and stored in a memory.

The computerized system further comprises a classification module which performs a computerized classification of cells in the digital image based on at least one of color, shape and texture in the digital image, as described above according to one embodiment. The resulting classification may be displayed and/or stored in the memory.

The computerized system further comprises a labeling module which labels the digital image by applying a trained neural network on at least one portion of the digital image which comprises a digital image of one cell classified under a first category by the classification module. The resulting label may be displayed and/or stored in the memory.

The process which is described above applies a plurality of successive steps with a decreasing ratio of efficiency/specificity. The first steps have a low specificity, but a high efficiency. The last steps have a high specificity, but a low efficiency. This gradation in the ratio of efficiency/specificity enables to obtain a high accuracy at a low computational cost.

According to an embodiment, some of the test functions described above are interpretable and/or explainable. This implies that the test function is deterministic. Thus, the result of the test function can be explained by a human. According to this embodiment, some of the test functions are not interpretable. "Not interpretable" means that it is not always possible for a human to explain why the test function provides such a result. This may be the case when the test function was deep-learned, i.e. was obtained as the result of a deep-learning process. In such a case, there is a high likelihood that the result of the deep-learned function is correct, but there is a low confidence by a human in the result of this function. The score is obtained by combining the result of the interpretable function and the result of the non-interpretable function, which overall provides both a high accuracy and a high reliability. Further, the system may comprise a computerized supervisor which controls the not interpretable functions based on the results of the interpretable functions.

The invention claimed is:

1. A method of labeling an image of cells of a patient, in particular an immunocytochemistry image, as positive to a biomarker, comprising:
    receiving a digital image of a stained immunocytochemistry biological sample of the patient,
    performing a computerized classification of cells in the digital image, said classification comprising:
        classifying pixels according to their color as positive,
        classifying regions of the digital image as positive according to a number of neighboring pixels classified as positive,
        applying a plurality of test functions on the positively classified region of the digital image to provide a test result representative of positivity to a respective test for the positively classified region, and
        applying a scoring function combining the test results of the test functions for the positively classified region of the digital image, and
    labeling the digital image by applying a trained neural network on at least one portion of the digital image which comprises a digital image of one cell classified as positive during the computerized classification.

2. The method according to claim 1, wherein the computerized classification of cells involves determining a barycenter of a cell or of a nucleus of said cell in the digital image.

3. The method according to claim 1, wherein the computerized classification of cells involves determining a barycenter of a cell or of a nucleus of said cell in the digital image and wherein the test functions are applied on a portion of the image around said barycenter.

4. The method according to claim 1, wherein performing a computerized classification of cells comprises classifying regions of the digital image according to the number of neighboring pixels of a pre-defined color range.

5. The method according to claim 1, wherein performing a computerized classification of cells comprises using at least one function which has been obtained through machine-learning applied on prior labelled data.

6. The method according to claim 1, wherein performing a classification of cells comprises:
    performing a first computerized classification of cells of the digital image based on at least one of color, shape and texture in the image, and
    on cells classified under a first category during the first computerized classification, performing a second computerized classification of said cells based on at least one of color, shape and texture in the digital image, different from the first computerized classification, and
    wherein labeling comprises applying the trained neural network on cells classified under a first category during the second computerized classification.

7. The method according to claim 1, wherein performing a computerized classification of cells includes labelling cells with respect to a growth inhibitor marker and/or a proliferation marker.

8. The method according to claim 1, wherein performing a computerized classification of cells includes labelling cells with respect to one or both of the KI67 marker or the p16-marker.

9. The method according to claim 1, further comprising:
non-surgically obtaining a biological loose-cells sample of the patient, and
acquiring a digital image of a stained immunocytochemistry biological sample of the patient.

10. A computer program comprising instructions which, when the program is executed by a computer, cause the computer to carry out the method of claim 1.

11. A computerized system for labeling an image of cells of a patient, in particular an immunocytochemistry image of a patient, as positive to a biomarker, comprising:
a reception module for receiving a digital image of a stained immunocytochemistry biological sample of the patient,
a classification module for performing a computerized classification of cells in the digital image, said classification module being adapted to classify pixels according to their color as positive, to classify regions of the digital image as positive according to the number of neighboring pixels classified as positive, to apply a plurality of test functions on the positively classified region of the digital image to provide a test result representative of positivity to a respective test for the positively classified region, and to apply a scoring function combining the test results of the test functions for the positively classified region of the digital image, and
a labeling module for labeling the digital image by applying a trained neural network on at least one portion of the digital image which comprises a digital image of one cell classified under a first category as positive by the classification module.

\* \* \* \* \*